United States Patent [19]

Ito

[11] Patent Number: 5,170,759
[45] Date of Patent: Dec. 15, 1992

[54] FUEL INJECTION CONTROL DEVICE FOR AN INTERNAL COMBUSTION ENGINE

[75] Inventor: Yasushi Ito, Shizuoka, Japan

[73] Assignee: Toyota Jidosha Kabushiki Kaisha, Toyota, Japan

[21] Appl. No.: 808,021

[22] Filed: Dec. 13, 1991

[30] Foreign Application Priority Data

Dec. 17, 1990 [JP] Japan ............... 2-402861

[51] Int. Cl.$^5$ ............... F02M 45/02; F02B 19/12
[52] U.S. Cl. ............... 123/276; 123/300; 123/305
[58] Field of Search ............... 123/276, 299, 300, 305, 123/481, 295

[56] References Cited

U.S. PATENT DOCUMENTS

| | | | |
|---|---|---|---|
| 4,090,379 | 2/1992 | Ito | 123/299 |
| 4,101,785 | 4/1992 | Ito | 123/299 X |
| 4,621,599 | 11/1986 | Igashira et al. | 123/300 |
| 4,920,937 | 5/1990 | Sasaki et al. | 123/276 X |
| 4,955,339 | 9/1990 | Sasaki et al. | 123/295 |
| 4,958,604 | 9/1990 | Hashimoto | 123/276 |
| 4,991,558 | 2/1991 | Daly et al. | 123/481 |

OTHER PUBLICATIONS

Patent Abstracts of Japan, Group M1025, vol. 14, No. 428, Sep. 14, 1990.

Primary Examiner—Tony M. Argenbright
Attorney, Agent, or Firm—Kenyon & Kenyon

[57] ABSTRACT

A fuel injection control device for an internal combustion engine having a plurality of cylinders, the device comprising a changing unit for respectively changing a control pattern of a fuel injection of each fuel injector corresponding to each cylinder from a first control pattern to a second control pattern, in accordance with the engine running state, to prevent a continuing of a change from the first control pattern to the second control pattern over all of the cylinders.

11 Claims, 11 Drawing Sheets

FUEL INJECTION CONTROL DEVICE FOR AN INTERNAL COMBUSTION ENGINE

BACKGROUND OF THE INVENTION

1. Field of the Invention

The present invention relates to a fuel injection control device for an internal combustion engine.

2. Description of Related Art

Japanese Unexamined Patent Publication No. 2-169834 discloses an internal combustion engine having a spark plug and a fuel injector for injecting fuel directly into the cylinder. In this disclosure, under a low engine load, a fuel injection only during a compression stroke is carried out, i.e., the fuel injector injects all of an amount of fuel to be injected during approximately the latter half of the compression stroke, and under a middle or high engine load, a divided fuel injection is carried out, i.e., during the fuel injection a part of an amount of fuel to be injected is injected during an intake stroke, and a remaining part of the amount of fuel to be injected is injected during a compression stroke.

In this engine, however, even though an engine load is constant, if a control pattern of a fuel injection (e.g., a fuel injection only during a compression stroke or a divided fuel injection) is changed, the engine torque is changed, for example, the engine torque when a fuel injection is made only during the compression stroke is different from the engine torque when a divided fuel injection is made.

Accordingly, when the control pattern of the fuel injection is successively changed, for example, from the fuel injection only during the compression stroke to the divided fuel injection over all of the cylinders, a torque difference between the fuel injection only during the compression stroke and the divided fuel injection, corresponding to each cylinder, is added over all of the cylinders, and thus a large average torque difference occurs, and as a result, a problem arises in that a large torque shock occurs.

SUMMARY OF THE INVENTION

An object of the present invention is to provide a fuel injection control device for an internal combustion engine by which the above problem is solved.

According to the present invention, there is provided a fuel injection control device for an internal combustion engine having a plurality of cylinders, fuel injectors corresponding to each cylinder, respectively, and pistons introduced into the cylinders, said fuel injection control device comprising: a detecting means for detecting an engine running state; a changing means for respectively changing a control pattern of a fuel injection of each fuel injector corresponding to each cylinder from a first control pattern to a second control pattern, in accordance with the engine running state, in such a way that a change from the first control pattern to the second control pattern is not continued over all of the cylinders.

The present invention may be more fully understood from the description of preferred embodiment of the invention set forth below, together with the accompanying drawings.

DESCRIPTION OF THE PREFERRED EMBODIMENTS

Figure 1:
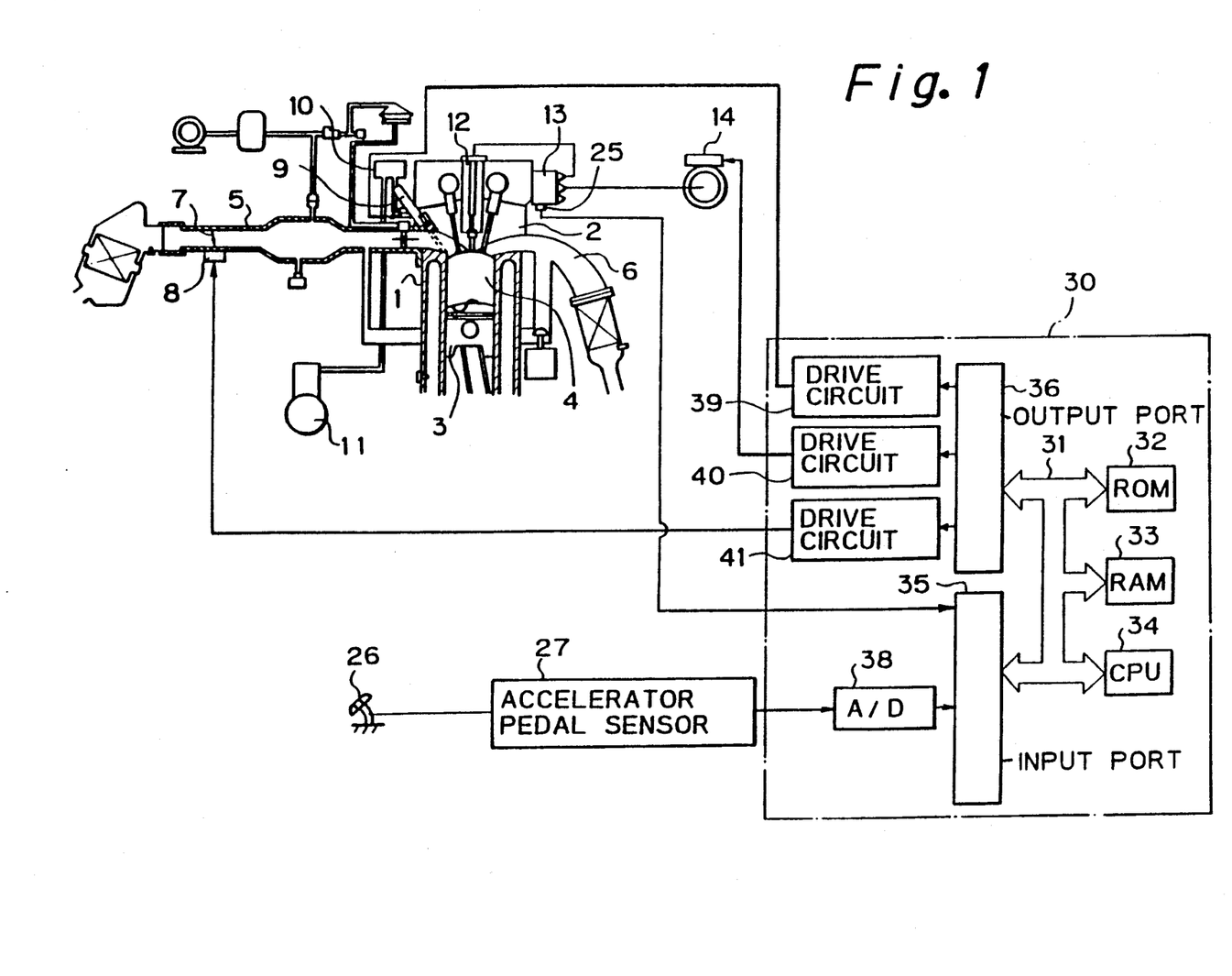
FIG. 1 is a schematic view of a four-cylinder gasoline engine.

Referring to FIG. 1, reference numeral 1 designates a cylinder block, 2 a cylinder head, 3 a piston, 4 a cylinder chamber, 5 an intake passage, and 6 an exhaust passage. A linkless throttle valve 7 is arranged in the intake passage 5 and is driven by a step motor 8 to be substantially fully open in all states other than an idling running state and a reduction running state. The tip of a fuel injector 9 extends to the cylinder chamber 4, and thus the fuel injector 9 can directly inject fuel into the cylinder chamber 4. Each fuel injector 9 corresponding to each cylinder is connected to a common reservoir tank 10, and this reservoir tank 10 is filled with fuel, under a constant high pressure, supplied by a fuel pump 11. A spark plug 12 is connected to an igniter 14 via a distributor.

The electronic control unit 30 is constructed as a digital computer and includes a ROM (read only memory) 32, a RAM (random access memory) 33, a CPU (microprocessor, etc.) 34, an input port 35, and an output port 36. The ROM 32, the RAM 33, the CPU 34, the input port 35, and the output port 36 are interconnected via a bidirectional bus 31. The distributor 13 contains a crank angle sensor 25 for detecting an engine speed, and this crank angle sensor 25 is connected to the input port 35. An accelerator pedal sensor 27 for detecting a degree $\theta A$ of opening of an accelerator pedal 26 is connected to the input port 35 via an AD converter 38.

The output port 36 is connected to the fuel injector 9, the igniter 14 and the step motor 8, via corresponding drive circuits 39, 40, 41, respectively.

Figure 2:
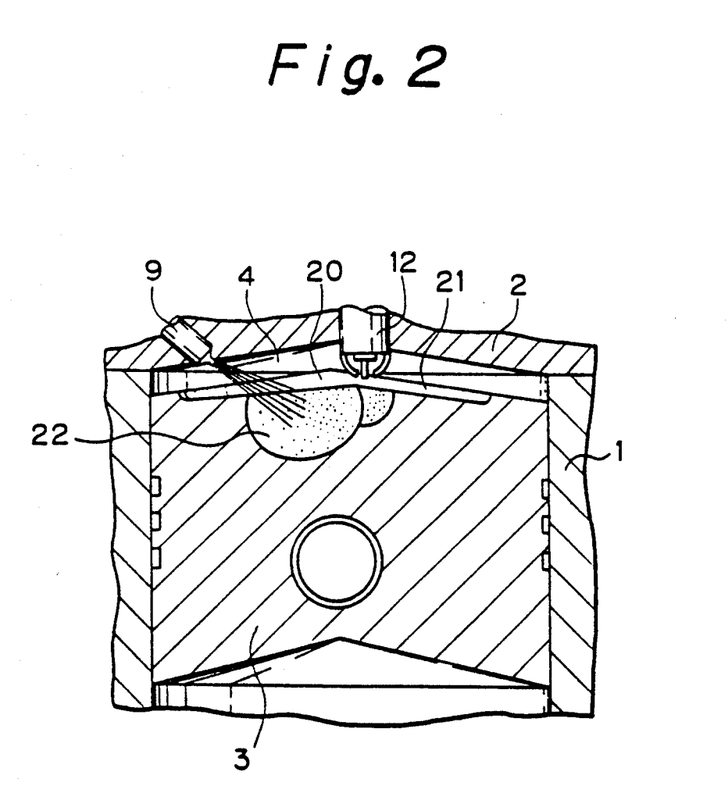
FIG. 2 is a cross-sectional side view of the engine to which the embodiment of the present invention is applied.

Referring to FIG. 2, a concave combustion chamber 20 formed on the top of the piston 3 comprises a shallow cavity 21 and a deep cavity 22 formed at the approximate center of the shallow cavity 21, and the shallow cavity 21 has a diameter larger than that of the deep cavity 22. An intake port is formed as a swirl port (not shown) and the fuel injector 9 has a plurality of nozzle openings. Fuel injected from the fuel injector 9 has a small spread angle and the speed of the injected fuel, along the direction of the fuel injection, is relatively fast. The fuel injector 9 is arranged on the top of the cylinder chamber 4, and inclined downward. The direction of the fuel injection and the fuel injection timing of the fuel injector 9 are determined to direct the fuel injected from the fuel injector 9 to the combustion chamber 20. The spark plug 12 is arranged in the combustion chamber 20 when the piston 3 is at TDC.

Figure 3:
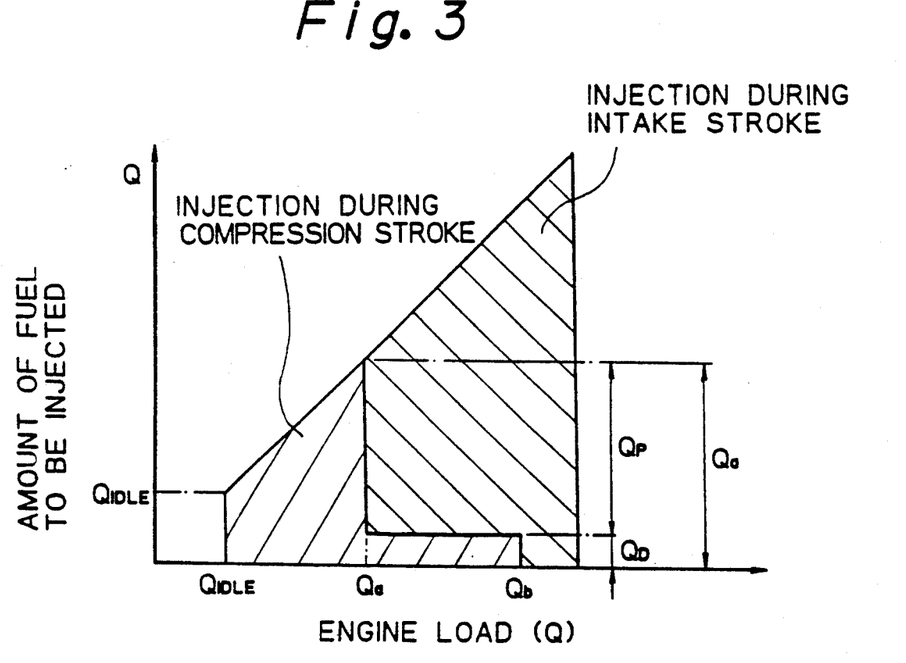
FIG. 3 is a diagram illustrating a control pattern of a fuel injection of the embodiment of the present invention.

FIG. 3 illustrates an example of a control pattern of a fuel injection. Referring to FIG. 3, the horizontal axis represents an engine load and the vertical axis represents an amount Q of fuel to be injected. As the engine load corresponds to the amount of fuel to be injected, in FIG. 3 the engine load is represented by the amount Q of fuel to be injected. The amount Q of fuel to be injected is calculated on the basis of an engine speed NE and a degree of opening A of the accelerator pedal 20.

When the calculated amount of fuel to be injected is equal to or larger than the amount $Q_{IDLE}$ of fuel for idling and smaller than $Q_a$, all of the calculated amount of fuel is injected during a compression stroke, i.e., a fuel injection only during the compression stroke is carried out. At this time, the amount of fuel to be injected during the compression stroke is increased from an amount $Q_{IDLE}$ of fuel for idling to an amount $Q_a$ of fuel for the medium engine load, in accordance with the increase of the engine load. When the calculated amount of fuel to be injected is equal to $Q_a$, the amount of fuel to be injected during the compression stroke is rapidly reduced from $Q_a$ to $Q_D$ and an amount of fuel to be injected during an intake stroke is rapidly increased from 0 to $Q_P$. $Q_a$, as calculated from the following equation, is an amount of fuel corresponding to a medium load.

$$Q_a = Q_D + Q_P$$

Where, $Q_D$ represents a first minimum amount of fuel to be injected during the compression stroke for forming an air-fuel mixture which can be ignited by the spark plug 12, and $Q_P$ represents a second minimum amount of fuel to be injected during the intake stroke for forming an air-fuel mixture in which a flame can be propagated even when the injected fuel is uniformly diffused in the cylinder chamber 4. The first minimum amount $Q_D$ of fuel for an ignition is considerably smaller than an amount $Q_{IDLE}$ of fuel for idling.

When the calculated amount of fuel to be injected is larger than $Q_a$ and smaller than $Q_b$, a part of the calculated amount of fuel is injected during the intake stroke and a remaining part of the calculated amount of fuel is injected during the compression stroke, i.e., a divided fuel injection is carried out. At this time, the amount of fuel to be injected during the compression stroke is constant at $Q_D$ and the amount of fuel to be injected during the intake stroke is increased in accordance with the increase of the engine load.

When the calculated amount of fuel to be injected is larger than $Q_b$, all of the calculated amount of fuel is injected during the intake stroke, i.e., a fuel injection only during the intake stroke is carried out, because an air-fuel premixture formed by the fuel injected during the intake stroke is rich enough to be ignited. Where, $Q_b$ represents a minimum amount of fuel to be injected during the intake stroke for forming an air-fuel mixture which can be ignited by the spark plug 12, even when the injected fuel is uniformly diffused in the cylinder chamber 4.

$Q_a$ and $Q_b$ represent engine loads for changing the control pattern of a fuel injection, and thus $Q_a$ and $Q_b$ are called a first and second changing engine load, respectively.

Figure 4:
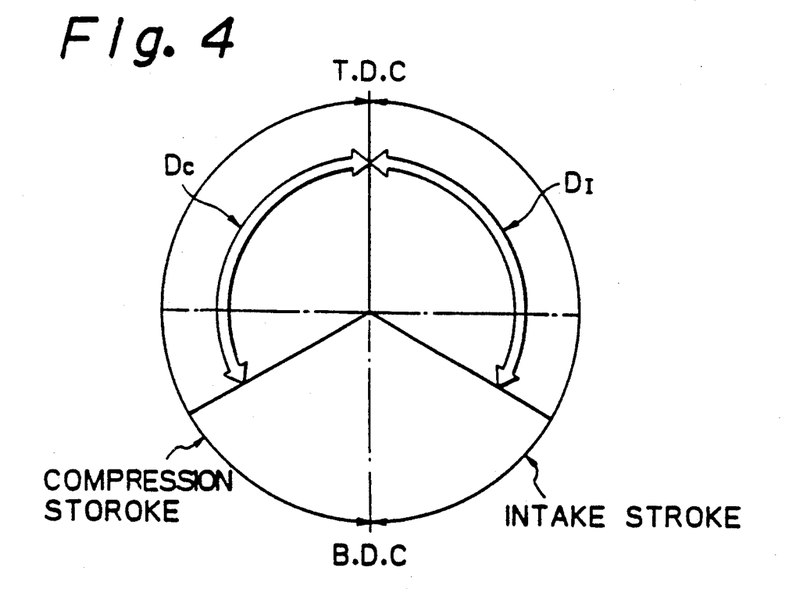
FIG. 4 is a diagram illustrating a fuel injection timing.

FIG. 4 illustrates a fuel injection period. Referring to FIG. 4, a fuel injection during the intake stroke is carried out within a period shown by $D_I$. This period $D_I$ corresponds to approximately a first half of the intake stroke. A fuel injection during the compression stroke is carried out within a period shown by $D_C$. The term $D_C$ corresponds to approximately a latter half of the compression stroke. The term $D_I$ and the term $D_C$ are symmetric with respect to the line connecting T.D.C and B.D.C in FIG. 4. As fuel is injected within the term $D_I$ or $D_C$, injected fuel does not directly impinge on the inner face of the cylinder block 1, and therefore, little injected fuel adheres to the inner surface of the cylinder block 1.

Referring to FIG. 2 and FIG. 3, when the calculated amount of fuel to be injected is smaller than the first changing engine load $Q_a$, i.e., the engine load is low, all of the calculated amount of fuel to be injected is injected to the combustion chamber 20 during approximately the latter half of the compression stroke (FIG. 4). As the fuel injection timing is delayed, most of the fuel is injected into the deep cavity 22. Fuel adhered to the inner wall of the deep cavity 22 is evaporated and becomes a mist, to form an air-fuel mixture in the combustion chamber 20. The air-fuel mixture has an air-fuel ratio of from rich to lean, and therefore, an inflammable air-fuel mixture exists. This air-fuel mixture is ignited by the spark plug 12 and burns best in the deep cavity 22.

Figure 5A:
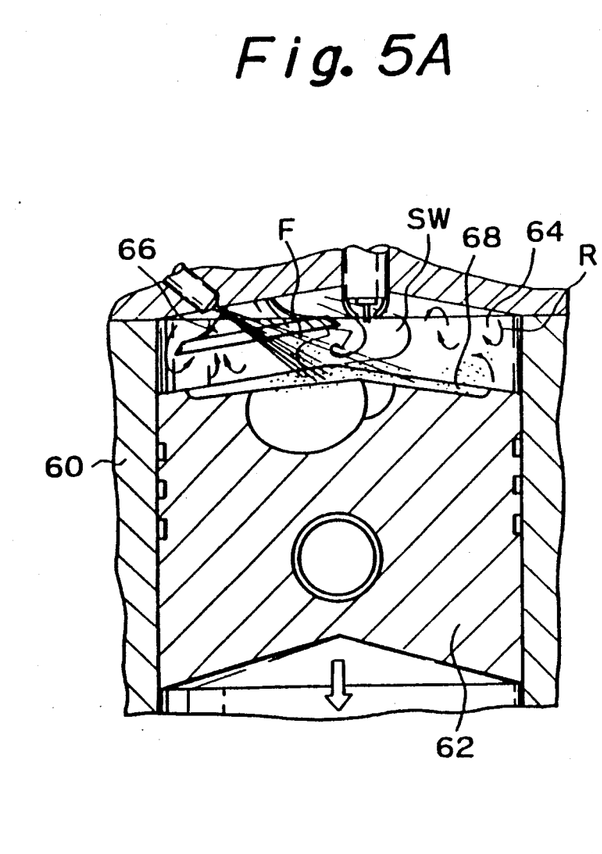
FIGS. 5A through 5D illustrate an operation of the embodiment.
Figure 5B:
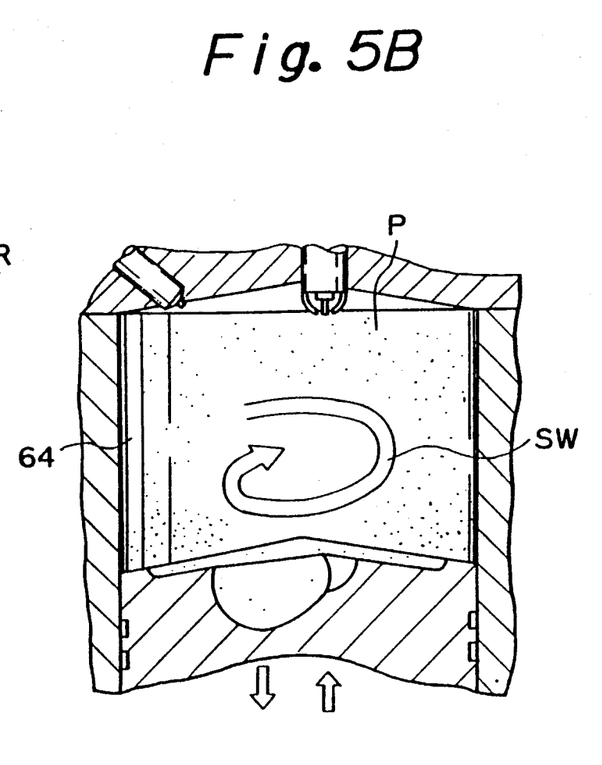

When the calculated amount Q of fuel to be injected is larger than $Q_a$ and smaller than $Q_b$, a part of the calculated amount Q of fuel is injected from the fuel injector 9 to the combustion chamber 20 during approximately the first half of the intake stroke (FIG. 5A). The injected fuel F is impinged mainly on the shallow cavity 21, a part of the impinged fuel is reflected to the cylinder chamber 4, and a remaining part of the impinged fuel is adhered to the inner wall of the shallow cavity 21 and then evaporated and becomes mist due to the heat of the inner wall of the shallow cavity 21. The injected fuel is diffused in the cylinder chamber 4 by a swirl SW and a turbulent flow R so that an air-fuel premixture P is formed in the cylinder chamber 4 (FIG. 5B). The air fuel ratio of the air-fuel premixture P is such that a flame can be easily propagated. When a swirl SW is strong, an air-fuel premixture is formed such that the air-fuel ratio of the air-fuel premixture near the inner wall of the cylinder block 1 is rich and the air-fuel ratio of the air-fuel premixture near the center of the cylinder chamber 4 is lean.

Note, when the fuel injection timing is advanced, i.e., fuel is injected when the piston 3 is close to TDC, most of the fuel is injected into the deep cavity 22 and the injected fuel is evaporated mainly in the deep cavity 22.

Figure 5C:
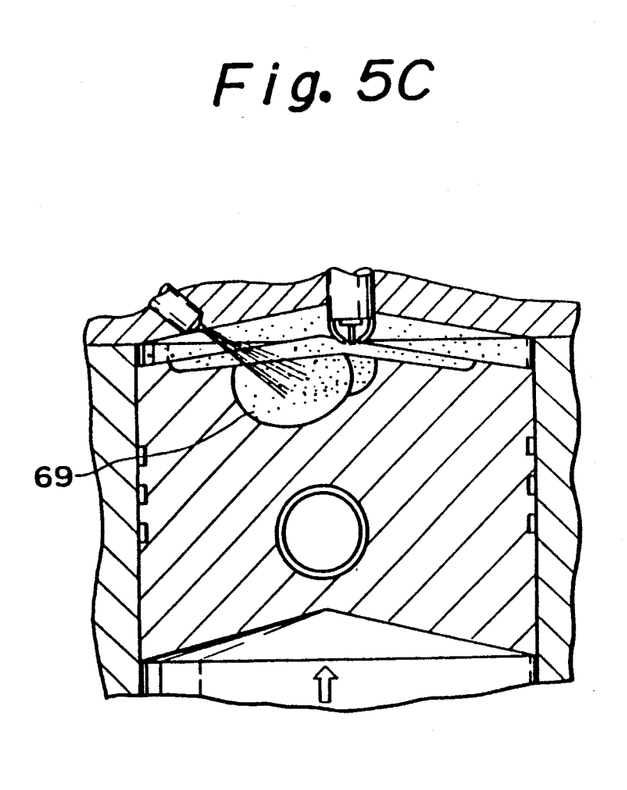
Figure 5D:
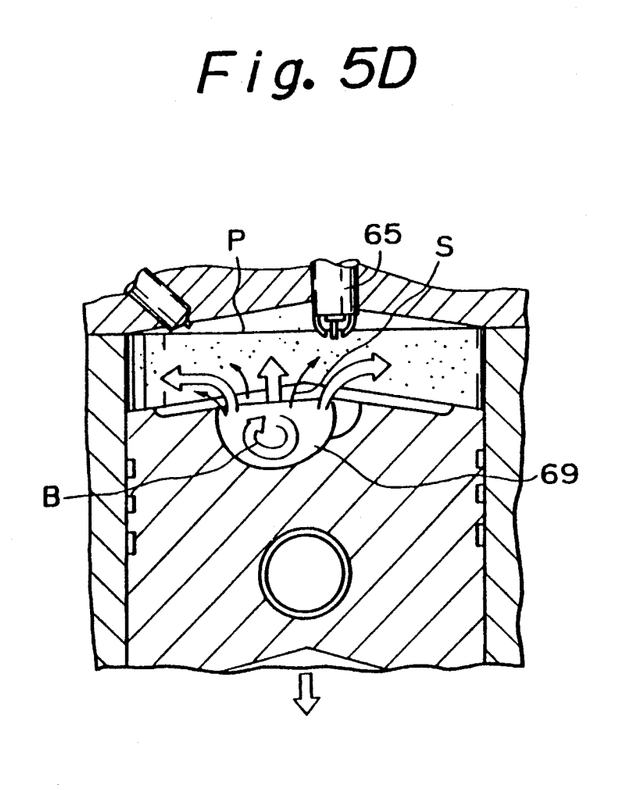

A remaining part of the calculated amount of fuel is injected from the fuel injector 9 into the deep cavity 22 during approximately the latter half of the compression stroke (FIG. 5C). Fuel adhered to the inner wall of the deep cavity 22 is evaporated by heat from the inner wall of the deep cavity 22 and from a compressed gas, and thus an air-fuel mixture is formed in the combustion chamber 4. The air-fuel mixture is nonuniform and has an air-fuel ratio of from rich to lean, and thus an inflammable air-fuel mixture exists. This nonuniform air-fuel mixture is ignited by the spark plug 12 and thus burnt (FIG. 5D). The flame B in the deep cavity 22 is propagated to the air-fuel premixture and the combustion is expanded to the outside of the deep cavity 22 by a reverse squish flow S.

Note, when a fuel injection during the compression stroke is advanced, i.e., fuel is injected to both the shallow cavity 21 and the deep cavity 22, the flame is distributed over the shallow cavity 21 and the deep cavity 22, and therefore, the propagation of the flame to the air-fuel premixture becomes easier.

When the calculated amount Q of fuel to be injected is larger than $Q_b$, all of the calculated amount of fuel to be injected is injected to the combustion chamber 20 during approximately the first half of the intake stroke (FIGS. 5A and 5B), and then the injected fuel is diffused in the cylinder chamber 4 and combusted.

Note, even if the calculated amount of fuel to be injected is constant, the engine torque changes when a change occurs in the control pattern of the fuel injection (i.e., a fuel injection only during the compression stroke, fuel injections during both the intake and compression stroke, or fuel injection only during the intake stroke). Accordingly, when the control pattern of the fuel injection is successively changed, for example, from the fuel injection only during the compression stroke to the divided fuel injection over all of the cylinders, a torque difference between the fuel injection only during the compression stroke and the divided fuel injection, corresponding to each cylinder is added over all of the cylinder, and thus a large average torque difference occurs, and as a result, a problem arises in that a large torque shock occurs.

Figure 6:
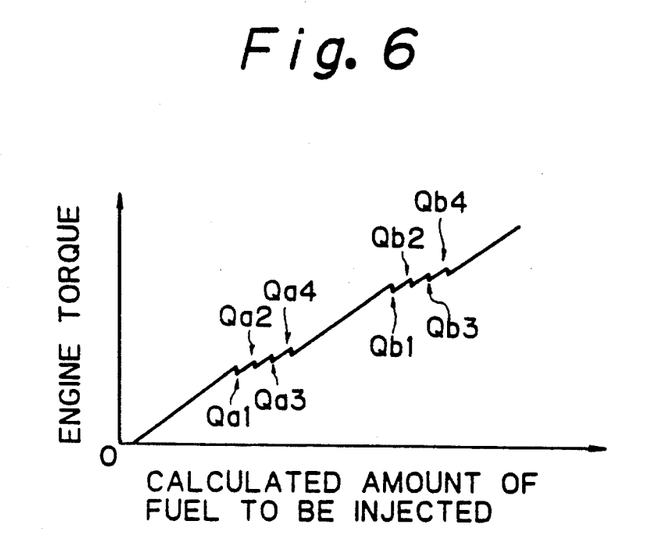
FIG. 6 is a diagram illustrating the relationship between the calculated amount of fuel to be injected and the engine torque, according to the first embodiment.

In this first embodiment of the present invention, as shown in FIG. 6, each first changing engine load $Q_a1$, $Q_a2$, $Q_a3$, $Q_a4$ corresponding to each cylinder is different from the other, and each second changing engine load $Q_b1$, $Q_b2$, $Q_b3$, and $Q_b4$ corresponding to each cylinder is also different from the other. Namely, $Q_a2$ corresponding to No. 2 cylinder is larger than $Q_a1$ corresponding to No. 1 cylinder, $Q_a3$ corresponding to No. 3 cylinder is larger than $Q_a2$, and $Q_a4$ corresponding to No. 4 cylinder is larger than $Q_a3$; $Q_b2$ corresponding to No. 2 cylinder is larger than $Q_b1$, $Q_b3$ corresponding to No. 3 cylinder is larger than $Q_b2$, and $Q_b4$ corresponding to No. 4 corresponding to No. 4 cylinder is larger than $Q_b3$. Accordingly, the control pattern of the fuel injection is not successively changed in a firing order, and therefore a large average torque difference does not occur, and thus the torque shock is reduced.

Figure 7:
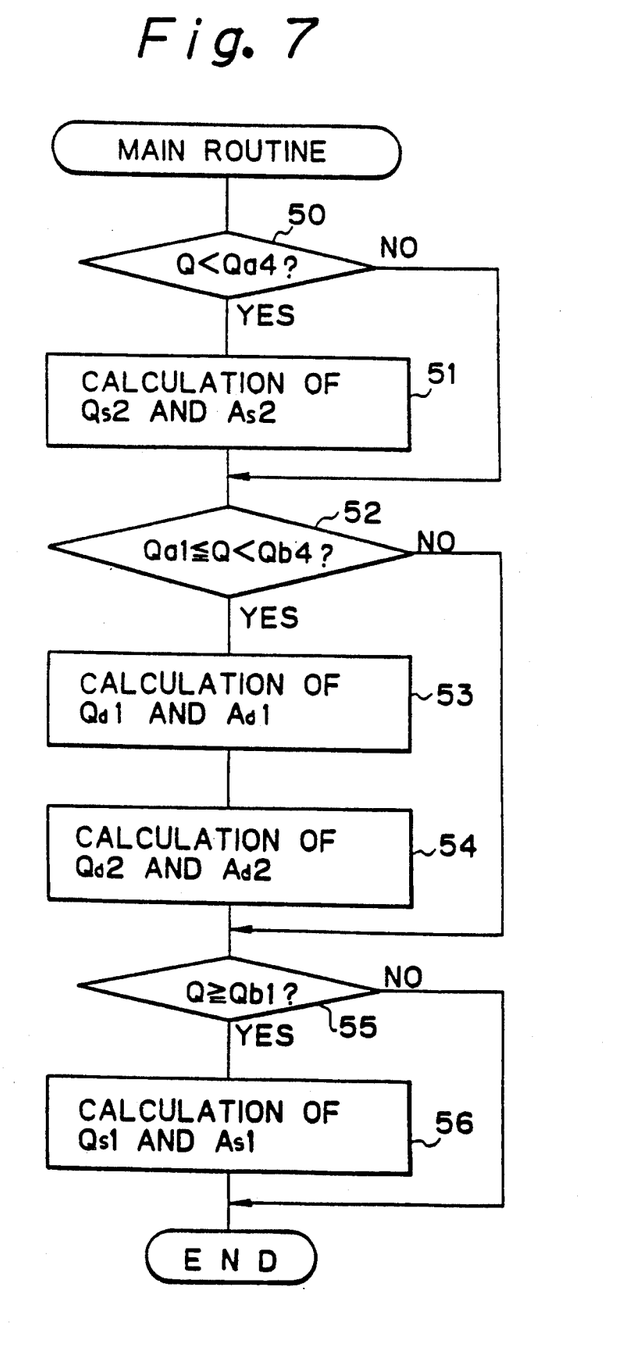
FIG. 7 is a flow chart for calculating an amount of fuel to be injected during an intake stroke, an amount of fuel to be injected during a compression stroke, and a fuel injection timing according to the first embodiment.
Figure 8:
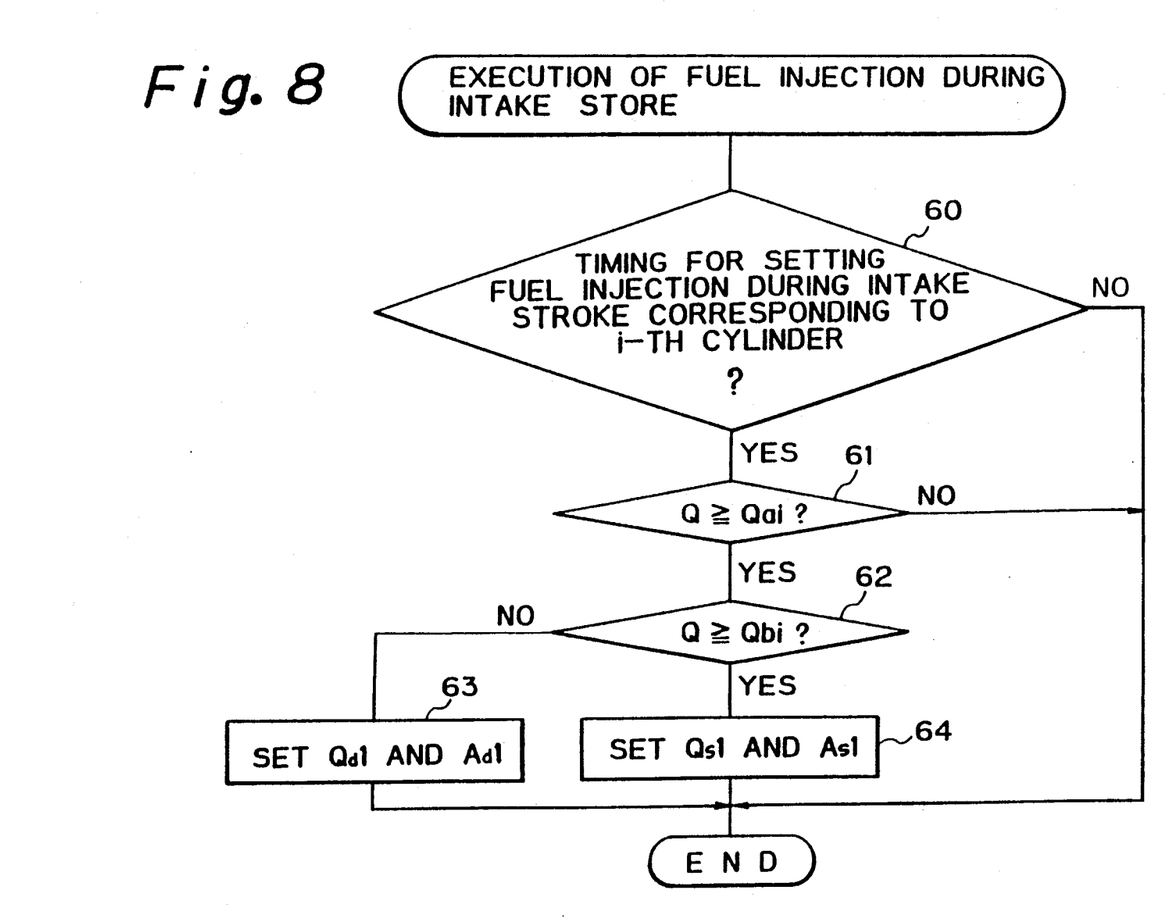
FIG. 8 is a flow chart for executing a fuel injection during the intake stroke, according to the first embodiment.
Figure 9:
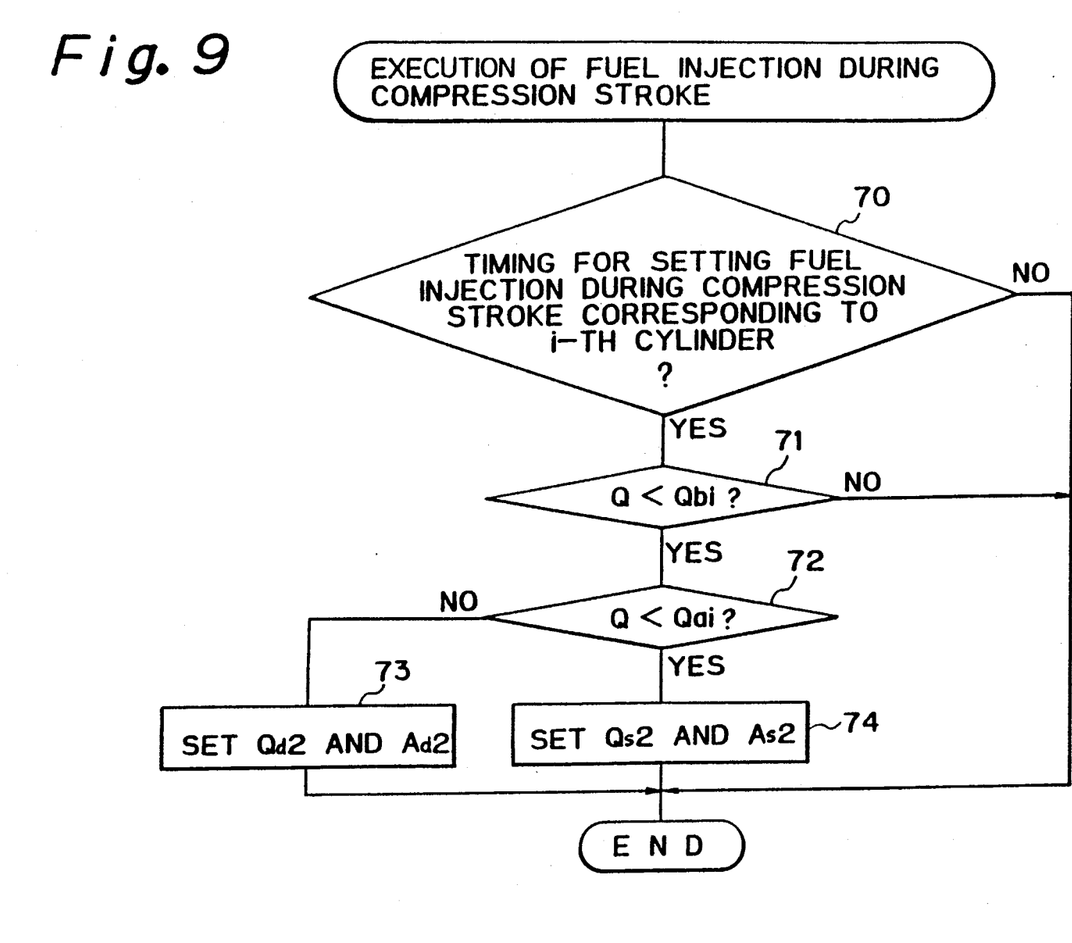
FIG. 9 is a flow chart for executing a fuel injection during the compression stroke, according to the first embodiment.

FIG. 7 through 9 illustrates a routine for carrying out the first embodiment of the present invention.

FIG. 7 illustrates a main routine for calculating the amount of fuel to be injected during the intake stroke, the amount of fuel to be injected during the compression stroke, and the fuel injection timing. This routine is executed at predetermined intervals.

At step 50, it is determined whether or not the calculated amount Q of fuel to be injected is larger than the first changing engine load $Q_a4$ corresponding to the No. 4 cylinder, which is the largest first changing engine load. When $Q<Q_a4$, since the fuel injection only during the compression stroke is carried out in at least one cylinder the routine goes to step 51 and the amount $Q_s2$ of fuel to be injected during the compression stroke and the fuel injection timing $A_s2$ during the compression stroke for the fuel injection only during the compression stroke is calculated. When $Q \geq Q_a4$, since the fuel injection only during the compression stroke is not carried out, step 51 is skipped.

At step 52, it is determined whether or not the calculated amount Q of fuel to be injected is equal to or larger than $Q_a1$, which is the smallest first changing engine load, and smaller than $Q_b4$, which is the largest second changing engine load. When $Q_a1 \leq Q < Q_b4$, since the divided fuel injection is carried out in at least one cylinder, the routine goes to step 53, and the amount $Q_d1$ of fuel to be injected during the intake stroke and the fuel injection timing $A_d1$ during the intake stroke for the divisional fuel injection is calculated. Then, at step 54, the amount $Q_d2$ of fuel to be injected during the compression stroke and the fuel injection timing $A_d2$ during the compression stroke for the divided fuel injection is calculated. When $Q \geq Q_a1$ or $Q \geq Q_b4$, since the divided fuel injection is not carried out, step 53 and step 54 are skipped.

At step 55, it is determined whether or not the calculated amount Q of fuel to be injected is equal to or larger than $Q_b1$, which is the smallest second changing engine load. When $Q \geq Q_b1$, since the fuel injection only during the intake stroke is carried out in at least one cylinder, the routine goes to step 56, and the amount $Q_s1$ of fuel to be injected during the intake stroke and the fuel injection timing $A_s1$ during the intake stroke for the one fuel injection during the intake stroke is calculated. When $Q<Q_b1$, since the fuel injection only during the intake stroke is not carried out, step 56 is skipped.

FIG. 8 is a routine for executing the fuel injection during the intake stroke. This routine is processed by sequential interruptions executed at every crank angle of 30°.

At step 60, it is determined whether or not the timing is that for setting a fuel injection during the intake stroke corresponding to the i-th (firing order) cylinder. When the determination is negative, the routine is completed. If the result is affirmative, the routine goes to step 61 and it is determined whether or not the calculated amount Q of fuel to be injected is equal to or larger than the first changing engine load $Q_ai$ corresponding to the i-th cylinder. When $Q<Q_ai$, since the fuel injection only during the compression stroke corresponding to the i-th cylinder is carried out, i.e., the fuel injection during the intake stroke is not carried out, the routine is completed. When $Q \geq Q_ai$, the divided fuel injection or the fuel injection only during the intake stroke is carried out, the routine goes to step 62, and it is determined whether or not the calculated amount Q of fuel to be injected is equal to or larger than the second changing engine load $Q_bi$ corresponding to the i-th cylinder.

When $Q<Q_bi$, since the divided fuel injection is carried out, the routine goes to step 63, and the amount $Q_d1$ of fuel to be injected during the intake stroke and the fuel injection timing $A_d1$ during the intake stroke for the divided fuel injection are set. Then the fuel injection during the intake stroke for the divided fuel injection is carried out by another routine (not shown).

When $Q \geq Q_bi$, since the fuel injection only during the intake stroke is carried out, the routine goes to step 64, and the amount $Q_s1$ of fuel to be injected during the intake stroke and the fuel injection timing $A_s1$ during the intake stroke for the fuel injection only during the intake stroke are set. Then the fuel injection only during the intake stroke is carried out by another routine (not shown).

FIG. 9 is a routine for executing the fuel injection during the compression stroke. This routine is processed by sequential interruptions executed at every crank angle of 30°.

At step 70, it is determined whether or not the timing is that for setting a fuel injection during the compression stroke corresponding to the i-th cylinder. When the determination is negative, the routine is completed. When the result is affirmative, the routine goes to step 71 and it is determined whether or not the calculated amount Q of fuel to be injected is smaller than the second changing engine load $Q_bi$ corresponding to the i-th cylinder. When $Q \geq Q_bi$, since the fuel injection only during the intake stroke corresponding to the i-th cylinder is carried out, i.e., the fuel injection during the compression stroke is not carried out, the routine is completed. When $Q < Q_bi$, the divided fuel injection or the fuel injection only during the compression stroke is carried out, the routine goes to step 72, and it is determined whether or not the calculated amount Q of fuel to be injected is smaller than the first changing engine load $Q_ai$ corresponding to the i-th cylinder.

When $Q \geq Q_ai$, since the divided fuel injection is carried out, the routine goes to step 73, and the amount $Q_d2$ of fuel to be injected during the compression stroke and the fuel injection timing $A_d2$ during the compression stroke for the divided fuel injection are set. Then the fuel injection during the compression stroke for the divided fuel injection is carried out by another routine (not shown).

When $Q < Q_ai$, since the fuel injection only during the compression stroke is carried out, the routine goes to step 74, and the amount $Q_s2$ of fuel to be injected during the compression stroke and the fuel injection timing $A_s2$ during the compression stroke for the fuel injection only during the compression stroke are set. Then the fuel injection only during the compression stroke is carried out by another routine (not shown).

A second embodiment of the present invention is now described with reference to FIGS. 10 through 12.

Figure 10:
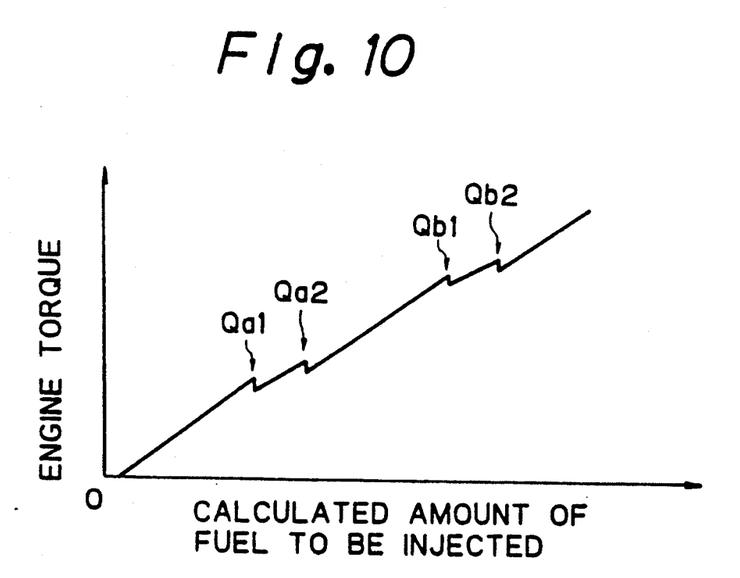
FIG. 10 is a diagram illustrating the relationship between the calculated amount of fuel to be injected and the engine torque according to the second embodiment.

In the second embodiment, as shown in FIG. 10, the first changing engine load $Q_a$ has a lower first changing engine load $Q_a1$ and an upper first changing engine load $Q_a2$, and the second changing engine load $Q_b$ has a lower second changing engine load $Q_b1$ and an upper second changing engine load $Q_b2$. When the engine load is smaller than $Q_a1$, the fuel injection only during the compression stroke is carried out; when the engine load is larger than $Q_a2$ and smaller than $Q_b1$, the divided fuel injection is carried out; and when the engine load is larger than $Q_b2$, the fuel injection only during the intake stroke is carried out. For the engine load between $Q_a1$ and $Q_a2$, the fuel injection only during the compression stroke and the divided fuel injection are carried out alternately, in the firing order, and for the engine load between $Q_b1$ and $Q_b2$, the fuel injection only during the intake stroke and the divided fuel injection are carried out alternately, in the firing order.

Figure 11:
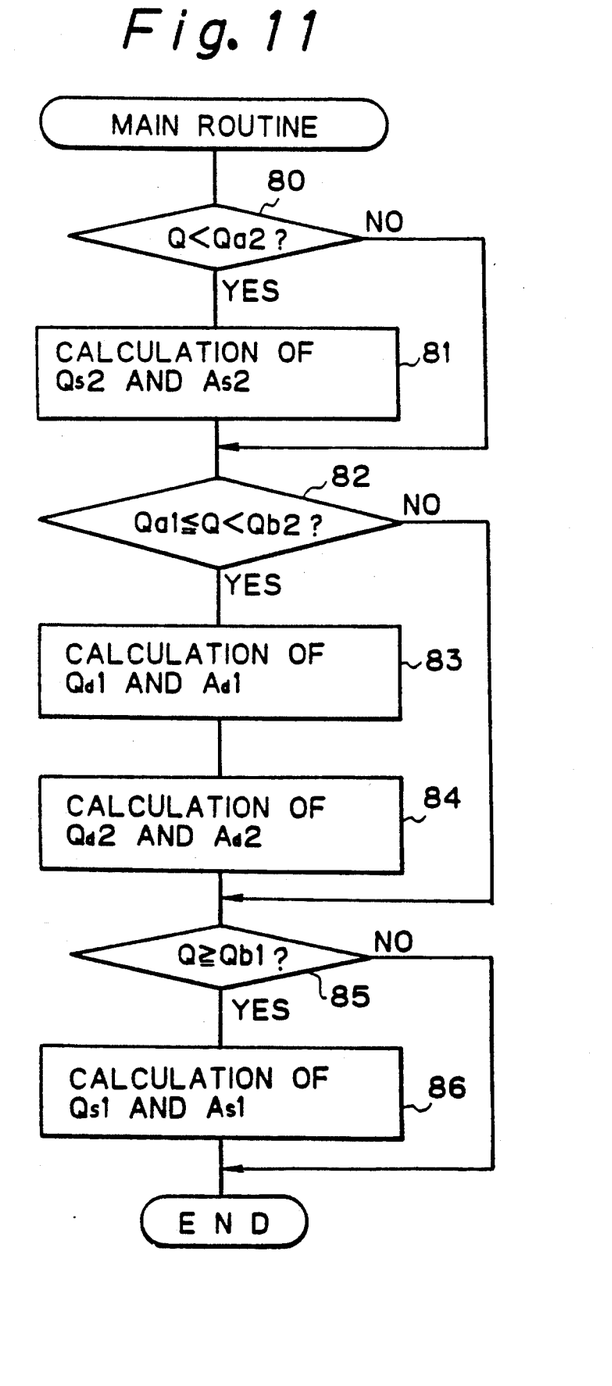
FIG. 11 is a flow chart for calculating an amount of fuel to be injected during an intake stroke, an amount of fuel to be injected during a compression stroke, and a fuel injection timing, according to the second embodiment.

FIG. 11 illustrates a main routine for calculating the amount of fuel to be injected during the intake stroke, the amount of fuel to be injected during the compression stroke, and the fuel injection timing. This routine is executed at predetermined intervals.

At step 80, it is determined whether or not the calculated amount Q of fuel to be injected is smaller than the upper first changing engine load $Q_a2$. When $Q < Q_a2$, since the fuel injection only during the compression stroke is carried out, the routine goes to step 81 and the amount $Q_s2$ of fuel to be injected during the compression stroke and the fuel injection timing $A_s2$ during the compression stroke for the fuel injection only during the compression stroke are calculated. When $Q \geq Q_a2$, since the fuel injection only during the compression stroke is not carried out, step 81 is skipped.

At step 82, it is determined whether or not the calculated amount Q of fuel to be injected is equal to or larger than $Q_a1$ and smaller than $Q_b2$. When $Q_a1 \geq Q < Q_b2$, since the divided fuel injection is carried out, the routine goes to step 83, and the amount $Q_d1$ of fuel to be injected during the intake stroke and the fuel injection timing $A_d1$ during the intake stroke for the divided fuel injection is calculated. Then, at step 84, the amount $Q_d2$ of fuel to be injected during the compression stroke and the fuel injection timing $A_d2$ during the compression stroke for the divided fuel injection are calculated. When $Q < Q_a1$ or $Q \geq Q_b2$, since the divided fuel injection is not carried out, step 83 and step 84 are skipped.

At step 85, it is determined whether or not the calculated amount Q of fuel to be injected is equal to or larger than $Q_b1$. When $Q \geq Q_b1$, since the fuel injection only during the intake stroke is carried out, the routine goes to step 86, and the amount $Q_s1$ of fuel to be injected during the intake stroke and the fuel injection timing $A_s1$ during the intake stroke for the fuel injection only during the intake stroke is calculated. When $Q < Q_b1$, since the fuel injection only during the intake stroke is not carried out, step 86 is skipped.

Figure 12:
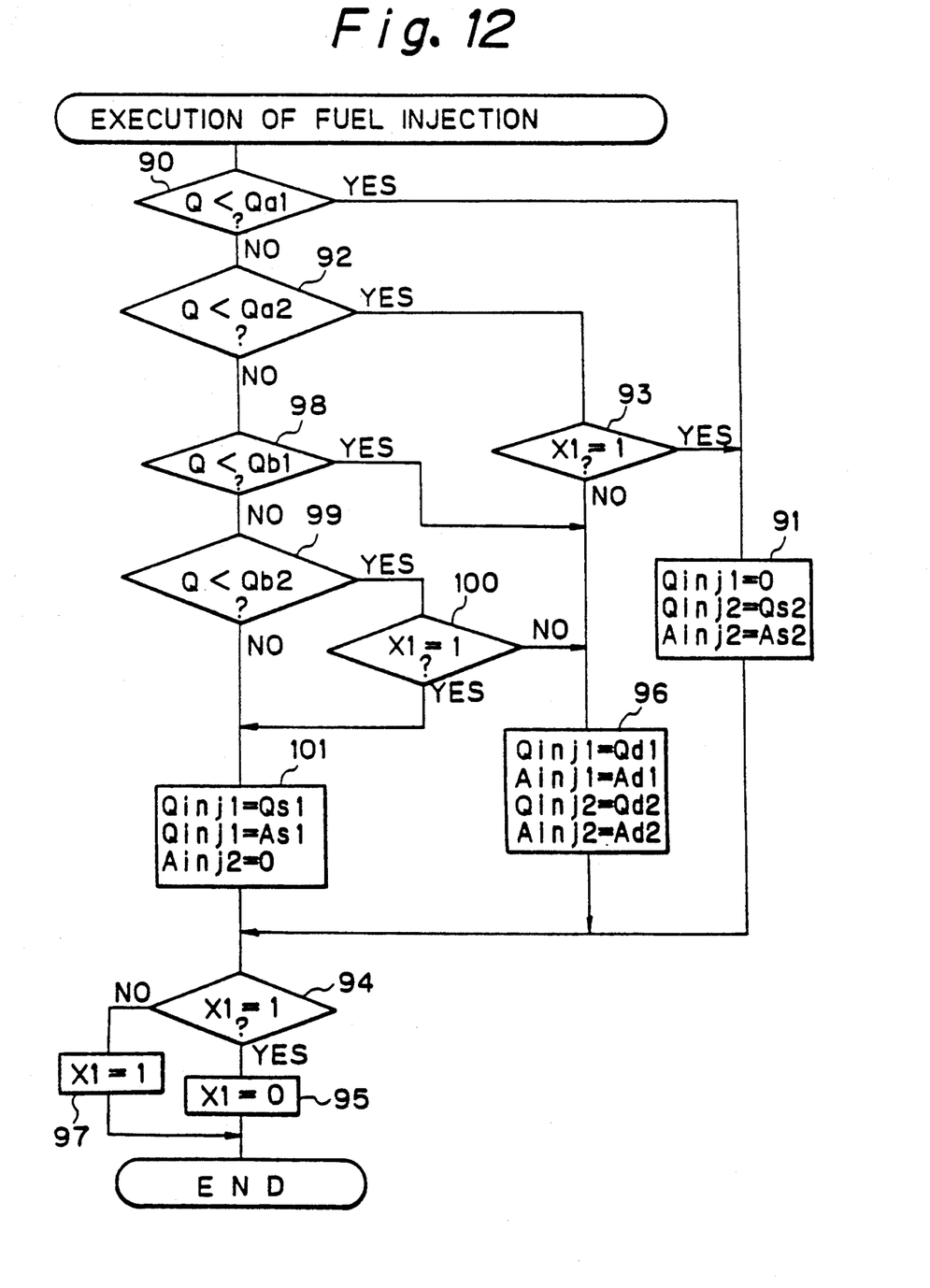
FIG. 12 is a flow chart for executing a fuel injection, according to the second embodiment.

FIG. 12 illustrates a routine for executing a fuel injection. This routine is processed by sequential interruptions executed at every crank angle of 180°.

Referring to FIG. 12, at step 90, it is determined whether or not the calculated amount Q of fuel is smaller than $Q_a1$. When $Q < Q_a1$, the routine goes to step 91. At step 91, 0 is stored in $Q_{inj}1$, $Q_s2$ is stored in $Q_{inj}2$, and $A_s2$ is stored in $A_{inj}2$. Then, the fuel injection only during the compression stroke is carried out on the basis of $Q_{inj}2$ and $A_{inj}2$ in another routine (not shown). When $Q \geq Q_a1$, the routine goes to step 92 and it is determined whether or not Q is smaller than $Q_a2$.

When $Q < Q_a2$, the routine goes to step 93 and it is determined whether or not a flag X1 is set to 1. If X1 is set to 1, the routine goes to step 91 and the fuel injection only during the compression stroke is carried out. Then, at step 94, it is determined whether or not the flag X1 is set to 1. Since X1 is set to 1 and the determination is affirmative, the routine goes to step 95 and the flag X1 is reset. Accordingly, in the next processing cycle, since the determination is negative at step 93, the routine goes to step 96. At step 96, $Q_d1$ is stored in $Q_{inj}1$, $A_d1$ is stored in $A_{inj}1$, $Q_d2$ is stored in $Q_{inj}2$, and $A_d2$ is stored in $A_{inj}2$ respectively, and then the divided fuel injection is carried out on the basis of $Q_{inj}1$, $A_{inj}1$, $Q_{inj}2$, and $A_{inj}2$ in another routine (not shown). At step 94, since the determination is negative, the routine goes to step 97 and X1 is again set to 1. Accordingly, when $Q_a1 \leq Q < Q_a2$, the fuel injection only during the compression stroke and the divided fuel injection are carried out alternately, in the firing order.

When $Q \geq Q_a2$ at step 92, the routine goes to step 98 and it is determined whether or not Q is smaller than $Q_b1$. When $Q<Q_b1$, i.e., when $Q_a2 \leq Q<Q_b1$, the routine goes to step 96 and the divided fuel injection is carried out. When $Q \geq Q_b1$ at step 98, the routine goes to step 99 and it is determined whether or not Q is smaller than $Q_b2$. When $Q<Q_b2$, i.e., when $Q_b1 \leq Q < Q_b2$, the routine goes to step 100 and it is determined whether or not X1 is set to 1. When X1 is not set, the routine goes to step 96 and the divided fuel injection is carried out. Conversely, when X1 is set, the routine goes to step 101. At step 101, $Q_s1$ is stored in $A_s1$ is stored in $A_{inj}1$, and 0 is stored in $Q_{inj}2$ respectively, and then the fuel injection only during the intake stroke is carried out. Accordingly, when $Q_b1 \leq Q<Q_b2$, the divided fuel injection and the fuel injection only during the intake stroke are carried out alternately, in the firing order. When $Q \geq Q_b2$ at step 99, the routine goes to step 101 and the fuel injection only during the intake stroke is carried out.

As mentioned above, according to the second embodiment of the present invention, since a change from the fuel injection only during the compression stroke to the divided fuel injection is not continued over all of the cylinders, a change from the divided fuel injection to the fuel injection only during the compression stroke is not continued over all of the cylinders, a change from the divided fuel injection to the fuel injection only during the intake stroke is not continued over all of the cylinders, and a change from the fuel injection only during the intake stroke to the divided fuel injection is not continued over all of the cylinders. Therefore, a large average torque difference does not occur, and thus the torque shock is reduced.

Although the invention has been described with reference to specific embodiments chosen for purposes of illustration, it should be apparent that numerous modifications can be made thereto without departing from the basic concept and scope of the invention.

I claim:

1. A fuel injection control device for an internal combustion engine having a plurality of cylinders, fuel injectors corresponding to each of the cylinders, respectively, and pistons introduced into the cylinders, said fuel injection control device comprising:
    a detecting means for detecting an engine running state;
    a changing means for respectively changing a control pattern of a fuel injection of each fuel injector corresponding to each cylinder, from a first control pattern to a second control pattern, in accordance with said engine running state, to prevent a continuing of a change from said first control pattern to said second control pattern over all of the cylinders.

2. A fuel injection control device according to claim 1, wherein each fuel injector injects fuel directly into each cylinder, respectively.

3. A fuel injection control device according to claim 2, wherein a concave combustion chamber is formed at the top of the piston.

4. A fuel injection control device according to claim 3, wherein said fuel injector injects fuel toward said concave combustion chamber.

5. A fuel injection control device according to claim 4, wherein said concave combustion chamber comprises a shallow cavity and a deep cavity formed at an approximate center of said shallow cavity.

6. A fuel injection control device according to claim 1, wherein said engine running state is represented by an engine load.

7. A fuel injection control device according to claim 1, wherein said first and second control patterns are represented by a fuel injection only during a compression stroke, and a fuel injection during an intake stroke and during the compression stroke.

8. A fuel injection control device according to claim 1, wherein said first and second control patterns are represented by a fuel injection only during an intake stroke, and a fuel injection during an intake stroke and during the compression stroke.

9. A fuel injection control device according to claim 1, wherein said changing means respectively changes said control pattern corresponding to each cylinder from said first control pattern to said second control pattern at a predetermined changing engine running state.

10. A fuel injection control device according to claim 9, wherein said each of predetermined changing engine running states corresponding to each cylinder is different from the other.

11. A fuel injection control device according to claim 1, wherein said changing means changes said control pattern from said first control pattern to said second control pattern and from said second control pattern to said first control pattern, alternately in a firing order, in a transient area between a first area in which said control patterns of all cylinders are said first control pattern and a second area in which said control patterns of all cylinders are said second control pattern.

* * * * *

UNITED STATES PATENT AND TRADEMARK OFFICE
CERTIFICATE OF CORRECTION

PATENT NO. : 5,170,759
DATED : December 15, 1992
INVENTOR(S) : Yasushi ITO

It is certified that error appears in the above-identified patent and that said Letters Patent is hereby corrected as shown below:

Column 3, line 25, change "opening A" to --opening OA--.

Column 5, line 44, between "$Q_a3$," and "$Q_a4$" insert --and--.

Column 5, line 59, change "FIG. 7 through 9" to --FIGS. 7 through 9--.

Column 6, line 4, after "cylinder" insert a comma.

Column 6, line 24, change "$Q \geq Q_a1$" to --$Q < Q_a1$--.

Column 7, line 39, change "step 74. and" to --step 74, and--.

Column 8, line 16, change "$Q_a1 \geq Q$" to --$Q_a1 \leq Q$--.

Column 8, line 44, change "At step 91. 0" to --At step 91, 0--.

UNITED STATES PATENT AND TRADEMARK OFFICE
CERTIFICATE OF CORRECTION

PATENT NO. : 5,170,759
DATED : December 15, 1992
INVENTOR(S) : Yasushi ITO

It is certified that error appears in the above-identified patent and that said Letters Patent is hereby corrected as shown below:

Column 9, line 12, after "stored in" insert $--Q_{inj}^1,--$.

Column 10, line 32, insert a comma after "means" and "respectively".

Column 10, line 38, change "9. wherein" to $--9,$ wherein$--$.

Signed and Sealed this

Fourteenth Day of December, 1993

BRUCE LEHMAN

Attest:

Attesting Officer

Commissioner of Patents and Trademarks